(12) United States Patent
Cerfeuillet et al.

(10) Patent No.: US 10,651,592 B2
(45) Date of Patent: May 12, 2020

(54) SEAL FOR AN EARTHING BOND

(71) Applicant: DUBUIS ET CIE S.A.S., Villebarou (FR)

(72) Inventors: Vincent Cerfeuillet, Maslives (FR); Mickael Cumant, Herbault (FR)

(73) Assignee: Dubuis et Cie S.A.S., Villebarou (FR)

( * ) Notice: Subject to any disclaimer, the term of this patent is extended or adjusted under 35 U.S.C. 154(b) by 0 days.

(21) Appl. No.: 16/107,219

(22) Filed: Aug. 21, 2018

(65) Prior Publication Data
US 2019/0006788 A1 Jan. 3, 2019

Related U.S. Application Data

(63) Continuation of application No. PCT/EP2017/053038, filed on Feb. 10, 2017.

(51) Int. Cl.
H01R 13/52 (2006.01)
F16B 43/00 (2006.01)
F16B 37/06 (2006.01)
H01R 4/50 (2006.01)
H01R 11/16 (2006.01)
H01R 4/64 (2006.01)

(52) U.S. Cl.
CPC ....... H01R 13/5219 (2013.01); F16B 37/065 (2013.01); F16B 43/001 (2013.01); H01R 4/5025 (2013.01); H01R 13/521 (2013.01); H01R 4/50 (2013.01); H01R 4/64 (2013.01); H01R 4/646 (2013.01); H01R 11/16 (2013.01)

(58) Field of Classification Search
CPC ................................. H01R 13/5219; H01R 13/521; H01R 4/5025; H01R 4/50; H01R 4/64; H01R 4/646; H01R 11/16

USPC ......................................... 439/271
See application file for complete search history.

(56) References Cited

U.S. PATENT DOCUMENTS

| 3,500,712 | A | * | 3/1970 | Wagner | F16B 43/001 411/369 |
| 3,535,678 | A | * | 10/1970 | Gulistan | F16B 33/002 174/153 R |
| 4,023,882 | A | | 5/1977 | Pettersson | |
| 4,473,714 | A | | 9/1984 | Brownell et al. | |
| 4,757,661 | A | * | 7/1988 | Hasan | E04D 3/3603 411/533 |
| 4,975,008 | A | * | 12/1990 | Wagner | F02B 77/00 411/337 |

(Continued)

FOREIGN PATENT DOCUMENTS

EP 1373742 B 12/2004

OTHER PUBLICATIONS

EP Office Action dated Feb. 1, 2019.
International Search Report dated Mar. 3, 2017.

Primary Examiner — Harshad C Patel
(74) Attorney, Agent, or Firm — Michael P. Leary; Kofi A. Schulterbrandt

(57) ABSTRACT

This invention relates to an earthing bond seal for sealing between a flanged bush of an earthing bond and a substrate with which the flanged bush is to form an electrical connection, the seal comprising: an upper surface for engagement with the flange of the bush; a lower surface for engagement with the substrate; and an opening extending between the upper and lower surfaces, wherein the upper surface is provided with a first recess configured to receive the flange of the bush.

15 Claims, 8 Drawing Sheets

(56) References Cited

U.S. PATENT DOCUMENTS

| | | | | |
|---|---|---|---|---|
| 5,236,272 | A * | 8/1993 | Hibbard | F16B 43/001 403/24 |
| 6,160,054 | A * | 12/2000 | Schwindeman | C08C 19/44 525/102 |
| 7,192,234 | B2 * | 3/2007 | Anderson | F16B 5/02 411/338 |
| 9,746,021 | B2 * | 8/2017 | Kawashima | F16B 43/001 |
| 2002/0182032 | A1 * | 12/2002 | Anderson | F16B 5/02 411/533 |
| 2004/0016111 | A1 * | 1/2004 | Mueller | B23P 19/062 29/700 |
| 2017/0175801 | A1 * | 6/2017 | Mickelsen | F16B 43/001 |

* cited by examiner

SEAL FOR AN EARTHING BOND

CROSS-REFERENCE TO RELATED APPLICATION

This application is a continuation of PCT/EP2017/053038, filed Feb. 10, 2017 which claims priority from European Patent Application No. 16305231.9, filed on Feb. 29, 2016, the disclosure of which is incorporated herein by reference.

BACKGROUND OF THE INVENTION

The invention relates to an earthing bond seal for creating an effective seal between an earthing bond and a substrate to which the earthing bond is to be electrically connected.

Electrical equipment used in many different industries must be earthed, including for example, communications equipment on aircraft or signaling equipment on railways. This typically requires each item of equipment to be electrically connected by means of metal braids or earthing wires to a painted substrate such as the frame of the aircraft. The ends of the metal braids or wires are received in terminals which are fixed to the substrate.

Fixing a terminal to a substrate may typically be carried out by means of a screw and a nut, the terminal being held tightly between the head of the screw and a surface of the substrate. In order to ensure good electrical contact between the terminal and the substrate, the surface of the substrate must be stripped of paint or other coating before the assembly of the screw and the nut. Once the assembly has been carried out, the stripped region of the support must be protected against corrosion. For the assembly of the screw and the nut, access is required to the two sides of the substrate during assembly.

EP 1 376 766 in the name of the applicant discloses a device for fixing an electrical connection terminal to a substrate. The device comprises a ring which is to be introduced into a cylindrical hole formed in the substrate, a socket for insertion into the ring and a screw for engagement with a threaded opening provided in the socket. When assembling the device, the ring is first positioned in the cylindrical hole in the substrate, and then a tensile force is exerted on the socket using a tool so as to introduce the socket into the ring with force, thereby causing radial expansion of the ring and locking of the ring in the hole. The screw is then screwed into the threaded opening in the socket, the terminal being held tightly between the head of the screw and the ring, thus making it possible to fix the terminal to the substrate and to establish electrical contact between the terminal and the substrate.

An advantage of this earthing bond is that it does not necessarily require the surface of the substrate to be stripped beforehand in order to ensure good electrical contact between the terminal and the substrate. This is because the electrical contact is produced between the ring and the inner surface of the cylindrical hole which is made in the substrate. A further advantage with this earthing bond is that it may be assembled without requiring both sides of the substrate to be accessible.

However, the integrity of such a device can be affected by the paint or other coating applied to the substrate. If the paint is applied to the substrate before the hole is drilled, paint in the vicinity of the hole may crack during or following the drilling process. This cracked paint leads to an uneven surface immediately surrounding the hole which affects the integrity of the seal formed between the earthing bond and the substrate. For instance, a poor seal could lead to corrosion of parts of the substrate exposed by the cracked paint. Sometimes the substrate may be painted subsequent to attaching the earthing bond to the substrate, but then it is difficult to prevent the ingress of paint in and around the earthing bond.

It is an object of the present invention to overcome the above noted problems by providing a seal which allows the earthing bond to be installed before or after the substrate is painted.

SUMMARY OF THE INVENTION

According to a first aspect of the invention, there is provided an earthing bond seal for sealing between a flanged bush of a earthing bond and a substrate with which the flanged bush is to form an electrical connection, the seal comprising: an upper surface for engagement with the flange of the bush; a lower surface for engagement with the substrate; and an opening extending between the upper and lower surfaces, wherein the upper surface is provided with a recess configured to receive the flange of the bush.

Advantageously, the recess may be stepped so as to define a diametrically larger upper portion and a diametrically smaller lower portion. The flange of the bush may locate in the lower portion and a cap described in more detail below may locate in the upper portion so as to overlie the bush.

In a preferred embodiment the lower surface has an annular groove defining inner and outer lands. The outer land may be narrower than the inner land and may project beyond the inner land. Furthermore, the annular groove may have a triangular cross-section possibly defined by an inner wall profile lying parallel to the axis of the opening and an outer wall profile inclined to the axis of the opening.

In addition, the seal may include a plurality of protuberances arranged to extend into the opening. In one embodiment, the seal includes four protuberances preferably spaced equidistantly around the opening and preferably extending radially into the opening. The protuberances collectively serve to centre the bush and each therefore defines an inner face against which the bush may bear.

According to a further aspect of the invention, there is provided and earthing bond seal assembly comprising: the seal described above and a cap arranged to close the recess. Preferably the cap includes a disc adapted to locate in the upper portion of the recess and conceal the lower portion. Furthermore, the cap may include a plug depending from the disc and arranged to extend through the opening in the seal. The plug may include gripping means for engagement with the bush when located in the opening. The gripping means may comprise multiple teeth disposed around the plug and preferably spaced equi-distantly apart. The plug may include multiple rows of gripping means along its length. Alternatively, the gripping means may be randomly disposed on the plug.

The cap may be furnished with a gripping portion, possibly upstanding from the disc, to facilitate handling of the cap.

BRIEF DESCRIPTION OF THE DRAWINGS

By way of example only, one embodiment of the present invention will now be described in detail with reference to the following drawings, in which:

FIG. 1b is a cross-sectional view along the line I-I of the cap shown in FIG. 1a.

FIG. 2b is a cross-sectional view along the line II-II through the earthing bond shown in FIG. 2a.

FIG. 3b is a cross-sectional view along the line III-III through the seal shown in FIG. 3a.

FIG. 4b is a cross-sectional view along the line IV-IV through the substrate shown in FIG. 4a.

FIG. 6b is a cross-sectional view along the line VI-VI through the seal, earthing bond and substrate shown in FIG. 6a.

FIG. 7b is a cross-sectional view along the line VII-VII through the arrangement shown in FIG. 7a.

FIG. 10b is a cross-sectional view along the line X-X through the seal, earthing bond and substrate shown in FIG. 10a.

DESCRIPTION OF THE PREFERRED EMBODIMENTS

Figure 1A:
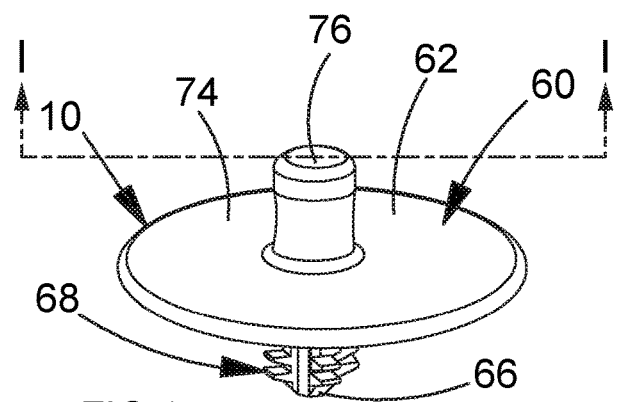
FIG. 1a is a perspective view of a cap forming part of a seal assembly.
Figure 1B:
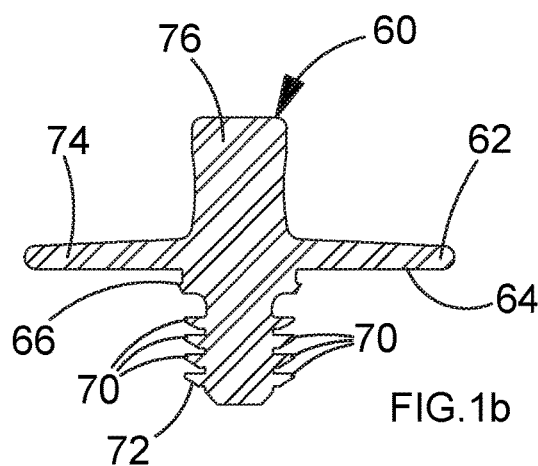
Figure 2A:
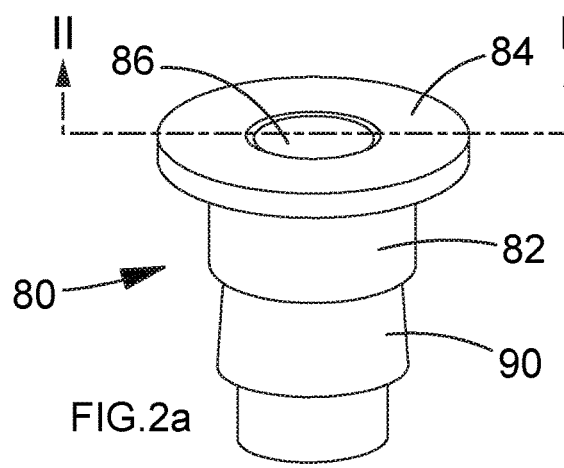
FIG. 2a is a perspective view of an earthing bond to which the seal assembly connects.
Figure 2B:
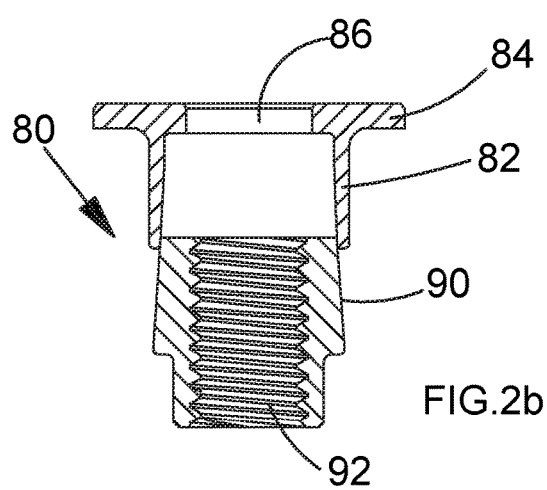
Figure 3A:
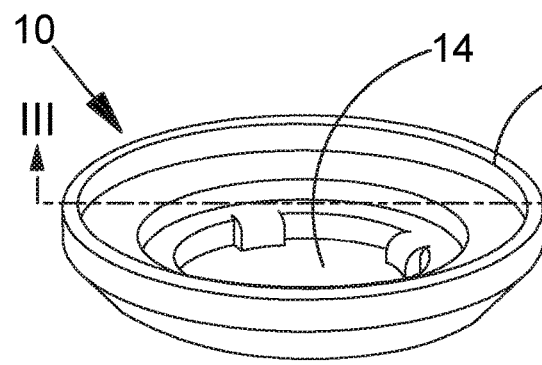
FIG. 3a is a perspective view of a seal forming part of the seal assembly.
Figure 3B:
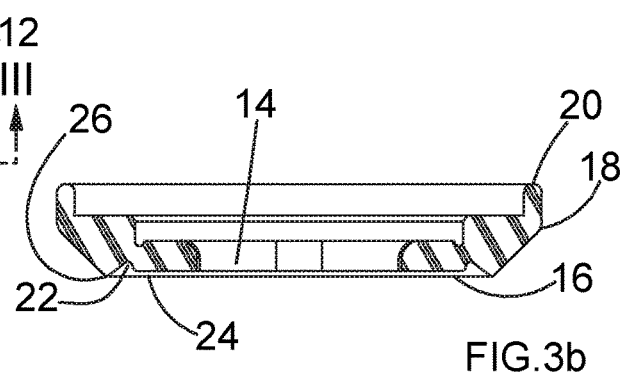
Figure 4A:
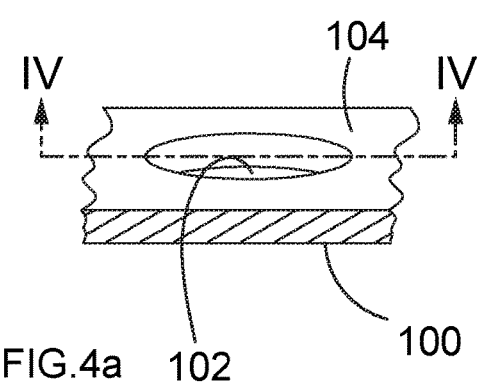
FIG. 4a is a perspective view of a substrate to which the seal and the earthing bond are to be mounted.
Figure 4B:
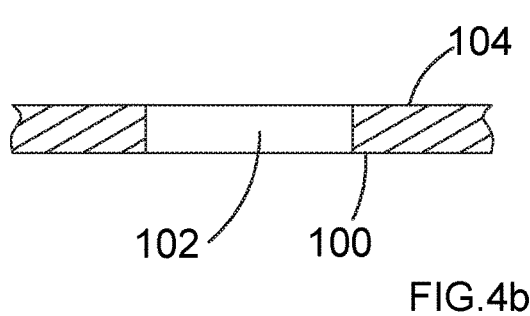

Referring initially to FIGS. 1a to 4b, there is shown an exploded view of a seal assembly 10 for an earthing bond 70 electrically connectable to a substrate 100. More specifically, there is provided a substrate 100 having a hole 102 therethrough, a seal 12 configured to rest on the substrate, an earthing bond 80 arranged to locate in the seal 12 and extend through the hole 102 of the substrate 100, and a cap 60 configured temporarily to conceal part of the earthing bond 80.

Figure 5A:
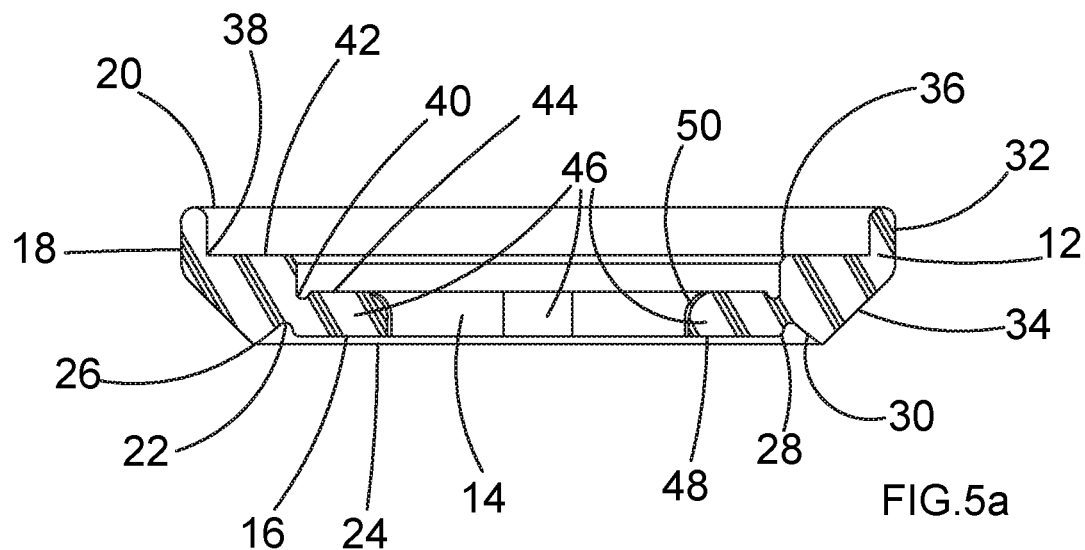
FIGS. 5a and 5b are enlarged views of FIGS. 3a and 3b, respectively.
Figure 5B:
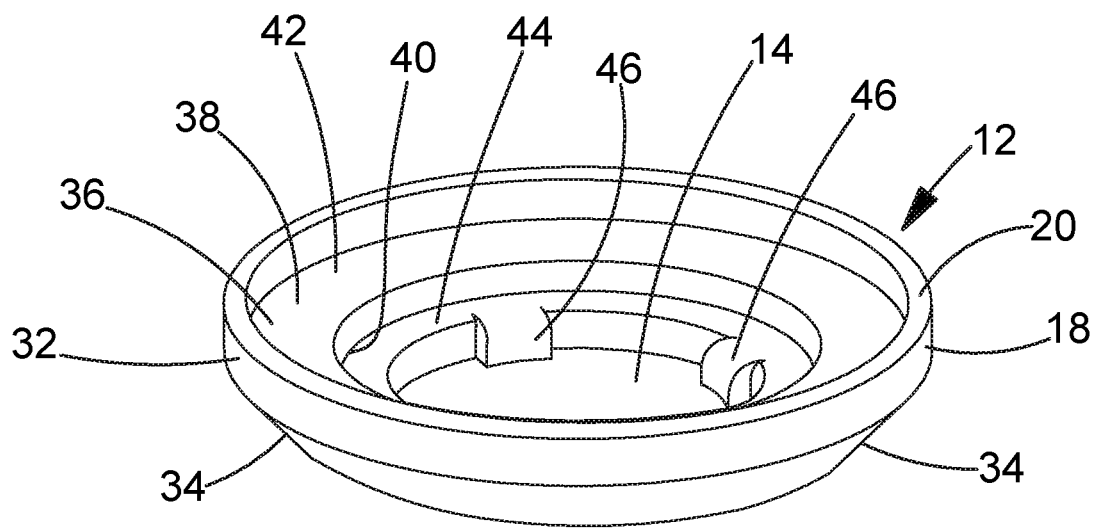

Referring now to FIGS. 5a and 5b, the seal 12 is made from an elastomeric material so as to offer some flexibility in order to deform under compression and thus comply with the first surface 102 of the substrate 100. The seal 12 comprises a relatively shallow circular body with a hole 14 through its centre. The seal 12 comprises a lower face 16, circumferential outer faces 18 and an upper face 20.

The lower face 16 is generally annular and has a groove 22 formed therein to define inner and outer lands 24, 26. The groove 22 has a generally triangular cross-section with an inner wall profile 28 arranged generally parallel to the axis of the seal 12 and an outer wall profile 30 arranged inclined to the axis of the seal. The groove 22 is located closer to the outer edge of the lower face 16 than the inner edge of the lower face such that the outer land 26 is significantly narrower than the inner land 24. The outer land 26 projects beyond the inner land 24 by up to 2 mm, and in some embodiments up to 1 mm. Preferably the outer land projects beyond the inner land by approximately 0.5 mm.

The outer face 18 comprises a cylindrical upper portion 32 which interfaces the upper surface 20 and a frusto-conical lower portion 34 which tapers towards and interfaces the outer land 26 of the lower face. The frusto-conical portion serves to reduce material and is particularly advantageous in the aerospace industry where the weight and size of components are to be minimised.

The upper surface 20 of the seal 12 is provided with a circular recess 36 arranged concentrically with the hole 14. The recess 36 is stepped so as to define a diametrically larger upper portion 38 and a diametrically smaller lower portion 40. The upper portion 38 defines a wider annular seat 42 and the lower portion 40 defines a narrower annular seat 44. The recess 36 occupies the majority of the upper surface 20, which in effect is defined by a narrow annular lip extending around the periphery of the seal 12.

Four protuberances 46 are spaced equi-distantly around the circumference of the hole 14 and extend radially into the hole. Each protuberance has a lower face 48 coplanar with the lower surface 16 and an upper face 50 which commences at the narrow annular seat 44 and curves downwardly towards the lower face 48.

Turning now to FIGS. 1a, 1b, 7a and 7b, the cap 60 comprises a circular disc 62 sized to locate in and to form a snug fit with the upper portion 38 of the recess 36. The circular disc 62 has a lower side 64 provided with a downwardly depending plug 66 furnished with multiple rows of gripping means 68. Each row of gripping means comprises four teeth 70 extending radially form the plug 68 and spaced ninety degrees apart. Each tooth 70 has an angled lower face 72 which serves as a barb so as to facilitate insertion and to resist removal of the plug 66 into an a bore 86 and 92 formed in the earthing bond 80 discussed below. The circular disc 62 has an upper side 74 opposite the lower side 64 and provided with a knob 76 to be gripped by a user.

The earthing bond 80 may take various forms, some of those being described in earlier patent applications in the name of the applicant. This earthing bond 80 comprises a generally cylindrical bush 82 with a diametrically larger flange 84 on its upper end and an axial bore 86 through its centre. This earthing bond 80 also comprises a frusto-conical dowel 90 with a threaded bore 92 through its centre and an upper end sized to form an interference fit with the lower end of the bush 82.

Figure 6A:
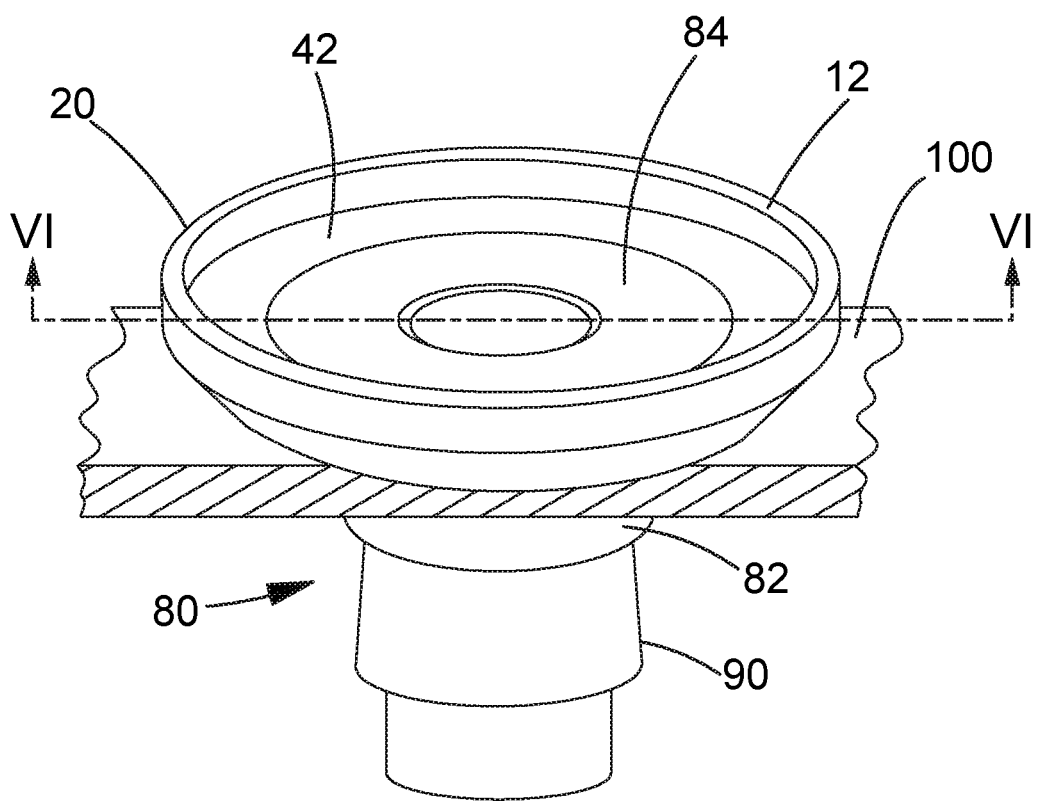
FIG. 6a is a perspective view of the seal and the earthing bond mounted to the substrate.
Figure 6B:
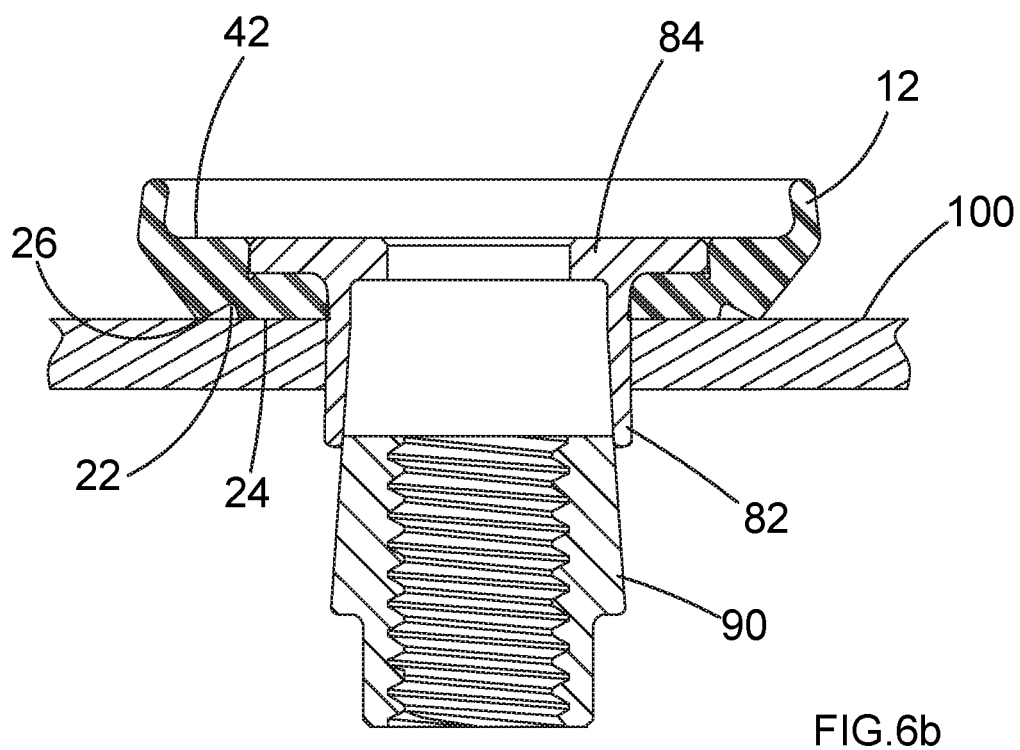
Figure 7A:
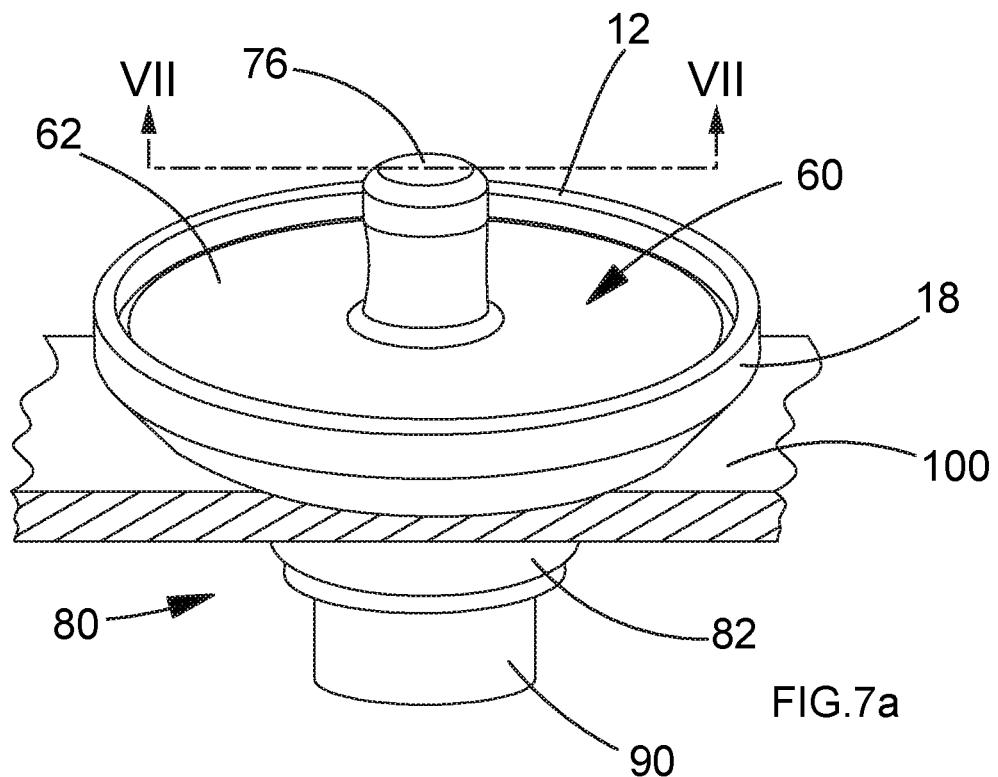
FIG. 7a is a perspective view of a cap mounted to the seal of FIGS. 6a and 6b.
Figure 7B:
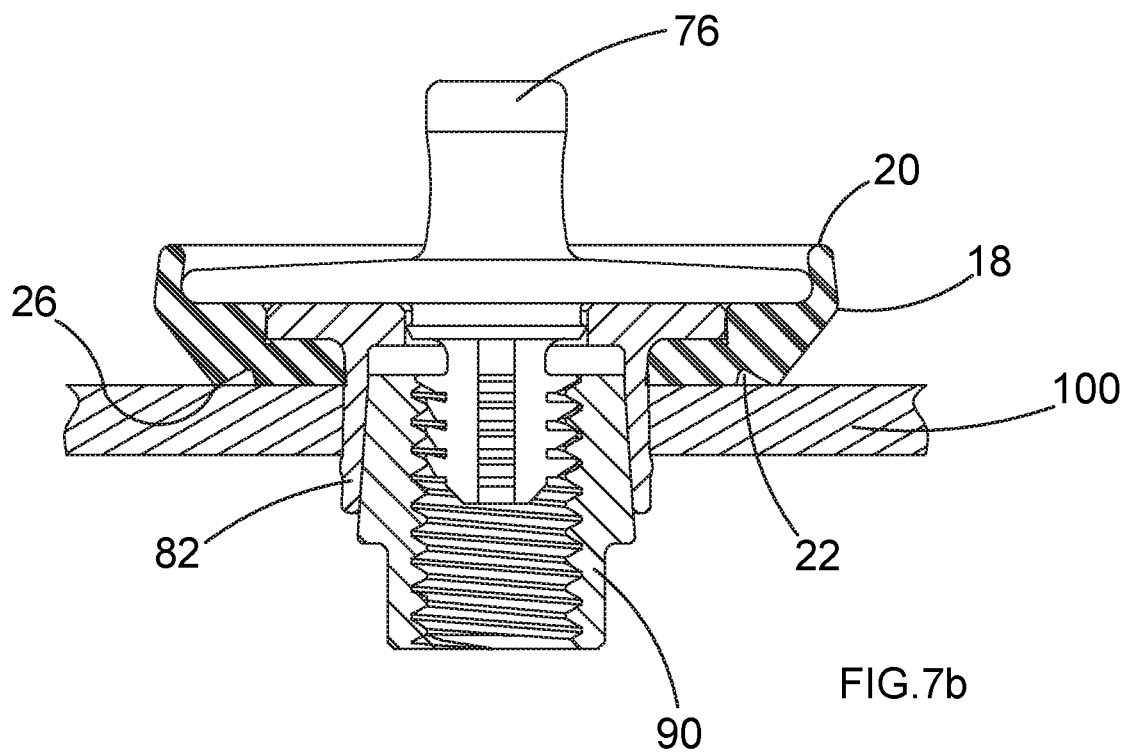

In use, the seal 12 is mounted to the upper surface 104 of the substrate 100 such that the holes 14,102 in the seal 12 and the substrate 100 align. The earthing bond 80 may then be located in the holes 14,102 of the seal 12 and the substrate 100 such that the flange 84 of the bush 82 sits on the narrow annular seat 44 and the end of the dowel 90 extends beyond the lower face 106 of the substrate 100 (see FIGS. 6a and 6b). The earthing bond 80 should be pushed firmly against the substrate 100 so as to compress the seal 12 against the first surface 104 of the substrate 100. The earthing bond 80 may then by tightened by holding the bush 82 while drawing the dowel 90 into the bush. This causes radial expansion of the bush 82 resulting in good electrical contact between the outer surface of the bush 82 and the inner surface of the substrate 100 defining the hole 102 (see FIGS. 7a and 7b). The cap 60 may then be fitted to the seal 12 such that the disc 62 locates in the wide annular seat 42 and the plug 66 locates in the threaded bore 92 of the earthing bond 80. Paint may be applied to the first surface 104 of the substrate 100 while the seal assembly 10 (seal 12 and cap 60) prevents the paint reaching the earthing bond 80.

Alternatively, the seal and the earthing bond may be fitted to a pre-painted substrate. Typically, the hole 102 may be drilled into the substrate 100 after the substrate is painted and this may lead to the paint around the hole 102 being chipped. The seal 12 is relatively flexible and may therefore deform slightly so as to follow the contours of the chipped paint against which it is pressed.

Figure 8:
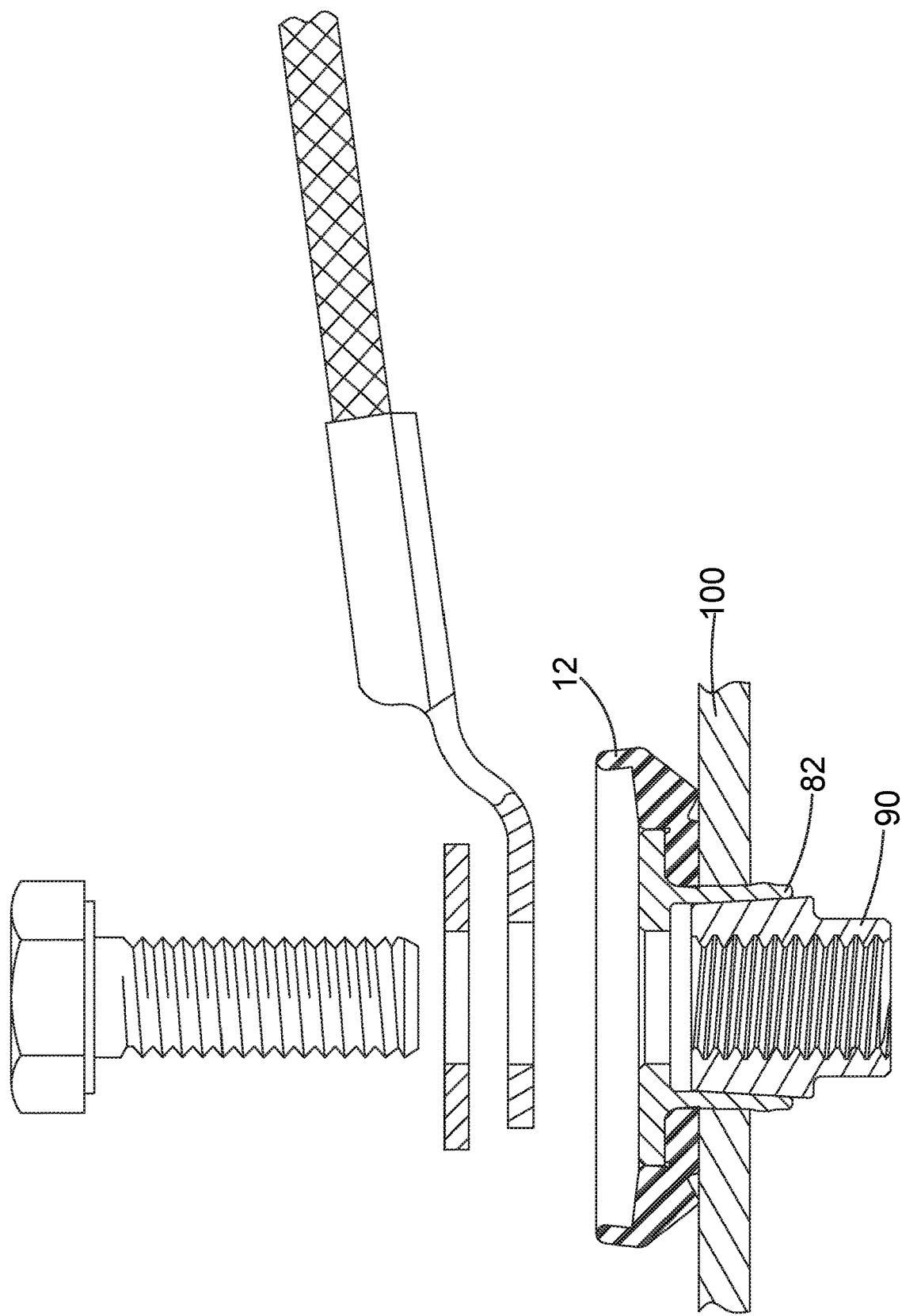
FIG. 8 is a cross-sectional view along the line VIII-VIII through the seal and the earthing bond secured to the substrate and awaiting connection to an electrical terminal.
Figure 9:
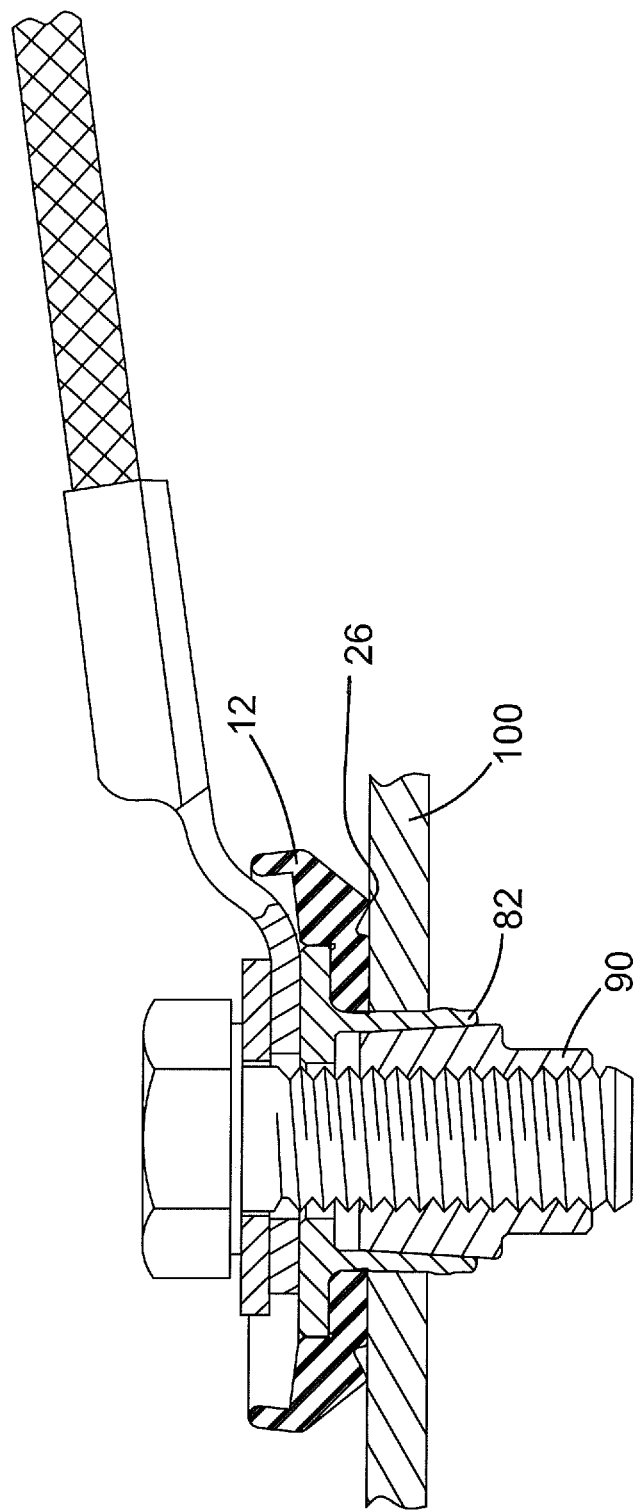
FIG. 9 is a cross-sectional view along the line IX-IX through the seal and the earthing bond secured to the substrate and electrically connected to the electrical terminal.

FIGS. 8 and 9 show the earthing bond 80 and seal 12 secured to the substrate and the cap 60 removed to facilitate connection to an electrical terminal.

Figure 10A:
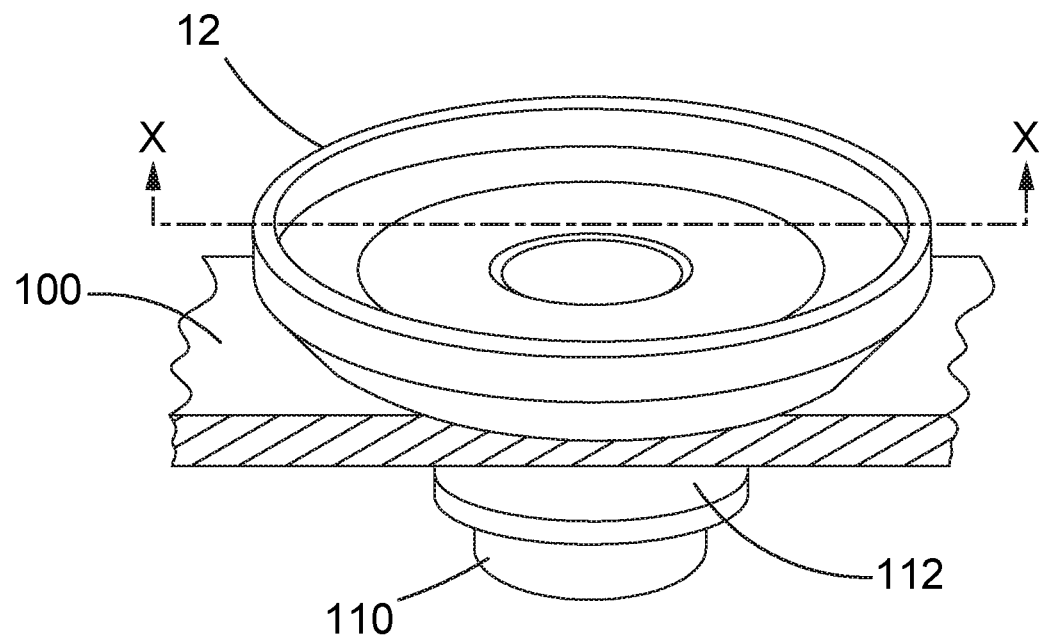
FIG. 10a is a perspective view of a seal and a crimped earthing bond mounted to the substrate.
Figure 10B:
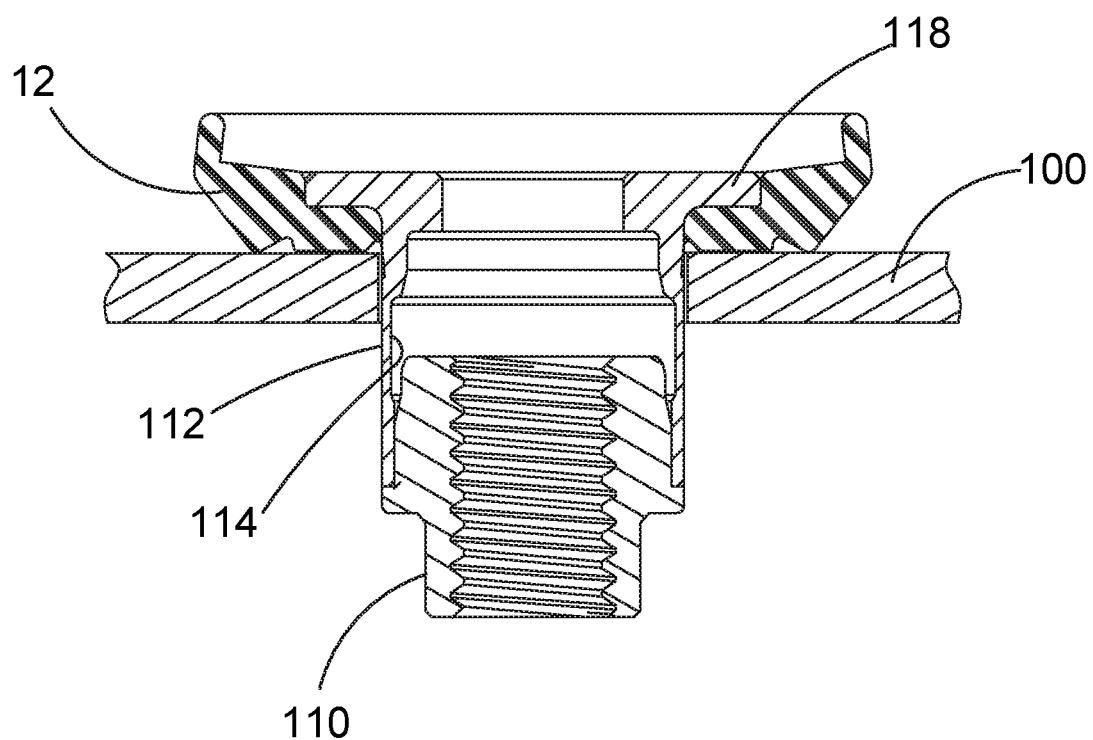
Figure 11:
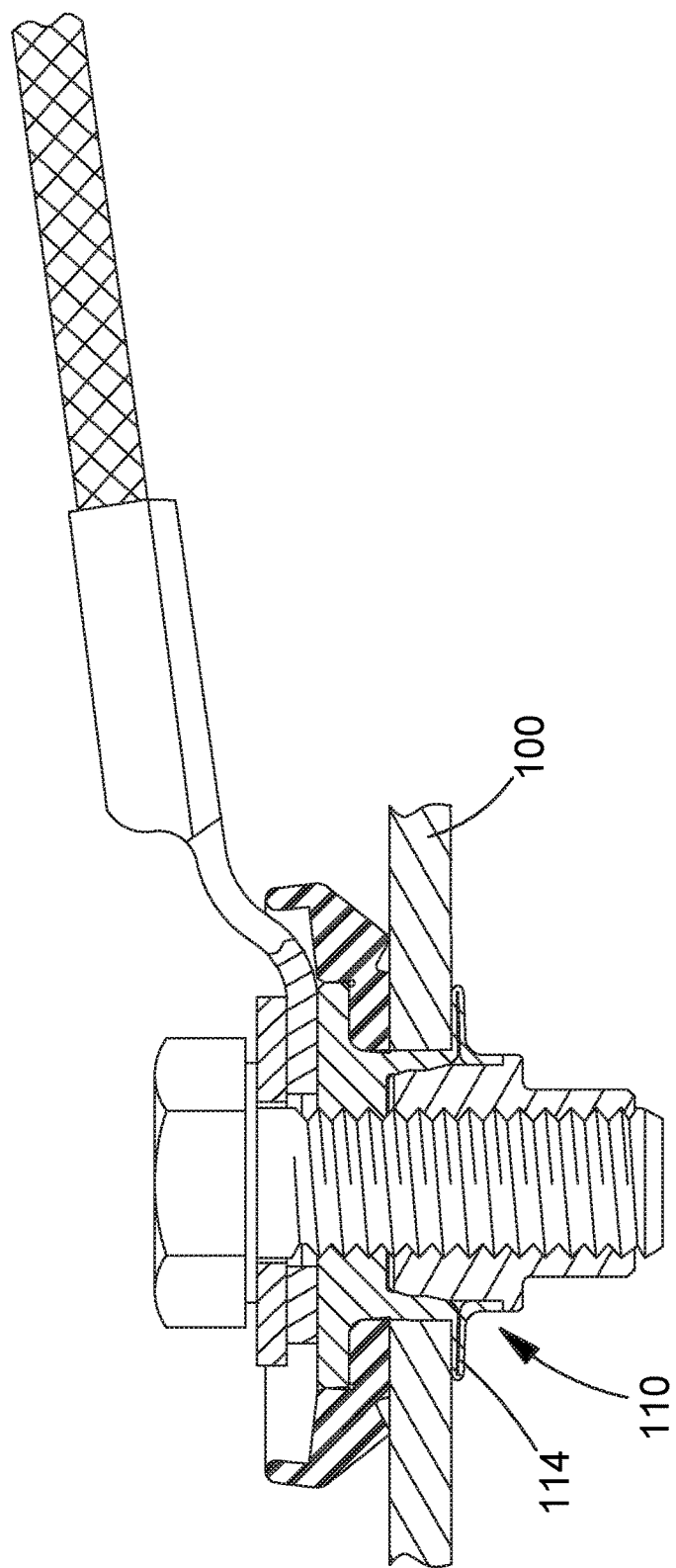
FIG. 11 is a cross-sectional view along the line XI-XI of the arrangement shown in FIGS. 10a and 10b with the crimped earthing bond tightened to the substrate and the electrical terminal connected to the earthing bond.

The seal assembly 10 works particularly well with an alternative type of earthing bond shown in FIGS. 10 and 11. This earthing bond 110 is configured to crimp as it is tightened to the substrate 100. In particular, the bush 112 includes a thin wall section 114 which crimps against the second side 106 of the substrate 100 as the dowel 116 is drawn into the bush 112. The crimping action (FIG. 11) against the second face 106 of substrate 100 urges the flange 118 of the bush 112 against the first face 104 of the substrate 100. When the seal assembly 10 is used in connection with this crimping earthing bond 110, the lower surface 16 of the seal 12 is compressed between the flange 118 and the substrate 100 and thus creates a better seal.

The earthing bond may also be used with an adaptor to facilitate connection to more than one electrical terminal. The adaptor may locate on the flange of the earthing bond and be enclosed by the lip extending around the upper portion of the recess. This form of enclosure provides added security for the adaptor and ensures the interface between the adaptor and the earthing bond is adequately sealed.

It will be appreciated by persons skilled in the art that the above embodiments have been described by way of example only, and not in any limitative sense, and that various alterations and modifications are possible without departure from the scope of the invention as defined by the appended claims.

What is claimed is:

1. A seal for sealing between a flange extending radially from a bush of an earthing bond and a substrate with which the bush is to form an electrical connection, the seal comprising:
   an upper surface for engagement with the flange of the bush;
   a lower surface for engagement with the substrate; and
   an opening extending between the upper and lower surfaces, and
   wherein the upper surface is provided with a first recess stepped so as to partially define an upper portion of larger diameter and lesser axial depth and a lower portion of smaller diameter and greater axial depth, and the lower portion is able to receive the flange of the bush.

2. The seal as claimed in claim 1, wherein the recess is circular and the upper portion includes a wider annular seat and the lower portion includes a narrower annular seat.

3. The seal as claimed in claim 1, wherein the lower surface has an annular groove defining inner and outer lands.

4. The seal as claimed in claim 3, wherein the outer land projects beyond the inner land.

5. The seal as claimed in claim 3, wherein the outer land is narrower than the inner land and projects radially beyond the inner land by no more than 2 mm.

6. The seal as claimed in claim 3, wherein the annular groove has a triangular cross-section.

7. The seal as claimed in claim 6, wherein the triangular cross-section is defined by an inner wall profile lying parallel to the axis of the opening and an outer wall profile inclined to the axis of the opening.

8. The seal as claimed in claim 1, wherein a plurality of protuberances extends into the opening.

9. The seal as claimed in claim 8, wherein four protuberances are spaced substantially equi-distantly apart and extend substantially radially into the opening.

10. The seal as claimed in claim 8, wherein the protuberances each define an inner face which collectively centre the bush.

11. A seal assembly for sealing between a flange extending radially from a bush of an earthing bond and a substrate with which the bush is to form an electrical connection, the seal assembly comprising:
    a seal including an upper surface for engagement with the flange of the bush, a lower surface for engagement with the substrate, an opening extending between the upper and lower surfaces, and the upper surface is provided with a recess stepped so as to partially define an upper portion of larger diameter and lesser axial depth and a lower portion of smaller diameter and greater axial depth, and the lower portion is configured to receive the flange of the bush; and
    a cap arranged to close the recess.

12. The seal assembly as claimed in claim 11 wherein the cap includes a disc adapted to locate in the upper portion of the recess and conceal the lower portion.

13. The seal assembly as claimed in claim 12, wherein the cap includes a plug extending axially from the disc and arranged to extend through the opening.

14. The seal assembly as claimed in claim 13, wherein the plug includes at least one gripper for engagement with the bush.

15. The seal assembly as claimed in claim 14, wherein each gripper comprises multiple teeth spaced around the plug.

* * * * *